(12) United States Patent
Berlanger et al.

(10) Patent No.: US 8,434,224 B2
(45) Date of Patent: *May 7, 2013

(54) METHOD FOR MANUFACTURE OF AN INTEGRALLY BLADED ROTOR, WITH TEMPORARY BLADE-HOLDING RING

(75) Inventors: Serge Berlanger, Leuville sur Orge (FR); Sebastien Bordu, Brie Comte Robert (FR); Thierry Jean Maleville, Milly la Foret (FR); Christophe Charles Maurice Roca, Soisy sur Seine (FR)

(73) Assignee: SNECMA, Paris (FR)

( * ) Notice: Subject to any disclaimer, the term of this patent is extended or adjusted under 35 U.S.C. 154(b) by 393 days.

This patent is subject to a terminal disclaimer.

(21) Appl. No.: 12/921,493

(22) PCT Filed: Mar. 25, 2009

(86) PCT No.: PCT/EP2009/053481
§ 371 (c)(1), (2), (4) Date: Sep. 8, 2010

(87) PCT Pub. No.: WO2009/121764
PCT Pub. Date: Oct. 8, 2009

(65) Prior Publication Data
US 2011/0016712 A1    Jan. 27, 2011

(30) Foreign Application Priority Data
Mar. 31, 2008 (FR) ...................... 08 52073

(51) Int. Cl.
*B21D 53/78* (2006.01)
*B24B 1/00* (2006.01)
*B24C 5/02* (2006.01)

(52) U.S. Cl.
USPC .............................. 29/889.7; 29/889.2; 29/889

(58) Field of Classification Search .................. 29/889.7, 29/889, 889.2; 451/38, 40, 99
See application file for complete search history.

(56) References Cited

U.S. PATENT DOCUMENTS

| | | | |
|---|---|---|---|
| 2,480,807 A * | 8/1949 | De Vlieg | 409/84 |
| 2,633,776 A * | 4/1953 | Schenk | 409/132 |
| 2,962,941 A * | 12/1960 | Stein et al. | 409/122 |
| 5,822,841 A | 10/1998 | Bales et al. | |
| 5,867,885 A | 2/1999 | Bales et al. | |
| 6,077,002 A * | 6/2000 | Lowe | 409/132 |
| 6,276,899 B1 | 8/2001 | Lambert et al. | |
| 7,831,332 B2 * | 11/2010 | Diehl | 700/190 |
| 7,967,659 B2 * | 6/2011 | Erickson et al. | 451/5 |
| 2003/0039547 A1 | 2/2003 | Bourgy et al. | |

(Continued)

FOREIGN PATENT DOCUMENTS

| EP | 1 285 714 | 2/2003 |
|---|---|---|
| EP | 1 433 557 | 6/2004 |

(Continued)

OTHER PUBLICATIONS

Zhao Wan-sheng, et al., "Machining Technology Used in Turbine Blisk", Aviation Precision Manufacturing Technology, vol. 36, No. 5, Oct. 2000, pp. 1-5 (with English Abstract).

(Continued)

*Primary Examiner* — Alexander P Taousakis
(74) *Attorney, Agent, or Firm* — Oblon, Spivak, McClelland, Maier & Neustadt, L.L.P.

(57) ABSTRACT

A method to manufacture an integrally bladed rotor, including: cutting a block of material by an abrasive waterjet, undertaken so as to reveal blade preforms extending radially from a disk, while retaining the material forming a linking mechanism between at least two preforms of directly consecutive blades, wherein the linking mechanism is spaced radially from the disk; followed by removal of the linking mechanism.

12 Claims, 8 Drawing Sheets

U.S. PATENT DOCUMENTS

2004/0124181 A1    7/2004    Wei et al.
2005/0025598 A1    2/2005    Nowak et al.

FOREIGN PATENT DOCUMENTS

| | | |
|---|---|---|
| EP | 1 502 682 | 2/2005 |
| FR | 2 699 850 | 7/1994 |
| WO | 2007 082504 | 7/2007 |

OTHER PUBLICATIONS

U.S. Appl. No. 12/933,955, filed Sep. 22, 2010, Berlanger, et al.
U.S. Appl. No. 12/933,951, filed Sep. 22, 2010, Berlanger, et al.
U.S. Appl. No. 12/933,978, filed Sep. 22, 2010, Berlanger, et al.
U.S. Appl. No. 12/933,953, filed Sep. 22, 2010, Berlanger, et al.
U.S. Appl. No. 12/933,884, filed Sep. 22, 2010, Berlanger, et al.

* cited by examiner

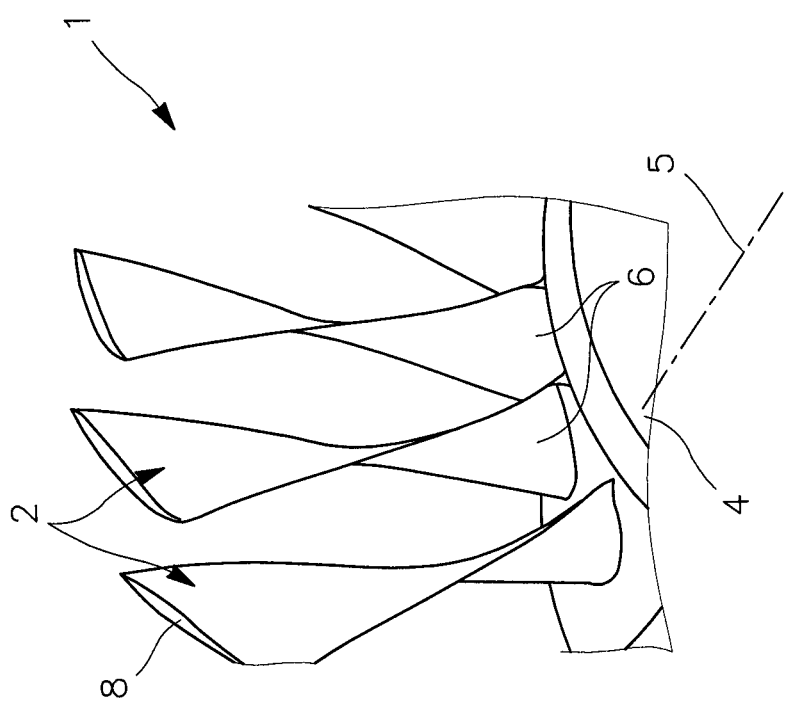

METHOD FOR MANUFACTURE OF AN INTEGRALLY BLADED ROTOR, WITH TEMPORARY BLADE-HOLDING RING

DISCLOSURE

1. Technical Field

The present invention relates generally to the field of manufacture of integrally bladed rotors, preferably for aircraft turbomachines.

2. State of the Prior Art

For the manufacture of an integrally bladed rotor, also called "DAM" [IBR] or "blisk" in English, it is possible to use a step of cutting by abrasive waterjet of a block of material, followed by one or more milling steps.

Use of a step of cutting by abrasive waterjet, prior to the milling, enables the manufacturing times and costs to be reduced substantially compared to a method based solely on milling. This can be explained in particular by the fact that such a manufacturing method requires that approximately 75% of the material of the initial block is removed in order to achieve the DAM. The removal of a large part of this material by cutting using an abrasive jet indeed enables the production times to be reduced, and also reduces the wear and tear of the milling machines.

However, this process cannot be considered to be totally optimised. Indeed, one disadvantage lies in the presence of deformations and vibrations of the blades in the course of this manufacturing method, and this disadvantage is greater the longer the blades. In order to limit their consequences for the quality of the DAM produced, these deformations and vibrations require that the various types of tooling are operated with reduced forward speeds, which is prejudicial in terms of production times. The vibrations and prolonged manufacturing times also cause a high degree of wear and tear to the tooling, negatively impacting production costs.

SUMMARY OF THE INVENTION

The purpose of the invention is therefore to provide at least partially a solution to the disadvantages mentioned above, compared with the embodiments of the prior art.

In order to accomplish this, the purpose of the invention is a method to manufacture an integrally bladed rotor comprising:
  a step of cutting a block of material by means of an abrasive waterjet, undertaken so as to reveal blade preforms extending radially from a disk, whilst retaining the material forming linking means between at least two preforms of directly consecutive blades, wherein the said linking means are spaced radially from the said disk; followed by
  a step of removal of the said linking means.

Thus, the invention is remarkable in that it provides, in the course of the step of cutting by abrasive waterjet, that linking means between at least two blade preforms, and preferably between all these blade preforms, are revealed. This enables the deformations and vibrations of the blades to be restricted greatly, or even eradicated, during their manufacture, since they remain attached mechanically one to another by the material of the initial block.

This specific feature advantageously enables high forward movement speeds to be applied to the various types of tooling, reducing production times, without impacting the quality of the DAM produced. In addition, the reduction of the production times, and the reduction of the vibrations of the blades in the course of their manufacture, reduces the wear and tear of the tooling, advantageously limiting production costs.

The step of cutting by abrasive waterjet is preferably accomplished such that the said linking means link between themselves a number of blade preforms which is strictly higher than three, and which are preferably directly consecutive. Nevertheless, several sets of directly consecutive preforms linked one to another might be envisaged, but with the sets not linked to one another. Be that as it may, according to the requirements met, the number of blade preforms attached to one another by the linking means, and the positioning of these means on the preforms, may be adjusted.

According to a preferred embodiment, the step of cutting by abrasive waterjet is accomplished such that the said linking means roughly form a ring, preferably centred on the axis of the disk. This ring preferentially extends over 360°, possibly being interrupted solely by the blade preforms which it links. Nevertheless, as mentioned above, it is possible for this ring not to be entirely closed, i.e. not to link certain directly consecutive preforms.

However, the step of cutting by abrasive waterjet is preferentially accomplished such that the said ring links between them all the blade preforms, and such that each one is intended subsequently to constitute a blade of the DAM. In such a case, it is preferable that the step of cutting by abrasive waterjet is accomplished such that the said ring links the heads of the blade preforms to one another. The ring then forms a peripheral annular portion of the cut block, with the blade preforms extending radially and inwards from this ring, in the direction of the disk.

However, an alternative solution could consist in having the step of cutting by abrasive waterjet accomplished such that the said ring links the said blade preforms to one another, at some distance from their heads, radially and inwards. In such a case it is, for example, envisaged for the ring to link the preforms to one another approximately at the middle points of their lengths.

It is stipulated that the two solutions proposed above may be combined, i.e. having at once a peripheral holding ring, and also an inner holding ring located radially internally relative to the peripheral ring. More generally, when a peripheral holding ring is to be used, there may be additional means of linking between the blade preforms, not necessarily in the form of a ring, without exceeding the scope of the invention.

The material forming linking means is preferably kept until the end of the step of cutting by abrasive waterjet. It is then removed only during a subsequent step of the DAM manufacturing method.

With this regard, it should be noted that the step of cutting by abrasive waterjet is followed by a step of milling of the blade preforms, where this step is preferentially accomplished so as to obtain profiled blade blanks, and this step is preferably followed by a step of finishing by milling of the blade blanks, so as to obtain the blades with the final profile.

According to a first preferred embodiment of the present invention, the said step of removal of the said linking means is accomplished prior to the said step of milling of the blade preforms, and thus preferably between this latter step and the step of cutting by abrasive waterjet.

According to a second preferred embodiment of the present invention, the step of removal of the said linking means is accomplished between the said step of milling of the blade preforms and the said finishing step.

More generally, it is possible to have the said step of removal of the said linking means accomplished subsequently to the said step of milling of the blade preforms, whether the latter step is followed by a separate step of finishing by milling, or whether it includes such a finishing step.

With this regard, according to a third preferred embodiment of the present invention, the said step of removal of the said linking means is accomplished subsequently to the said finishing step.

Naturally, other traditional steps can be implemented in the method according to the invention, such as:
- turning of the block of material before the step of cutting using an abrasive waterjet;
- polishing and/or shot-blasting of the blades after the finishing step;
- cutting the blades to length;
- and balancing of the DAM.

The said integrally bladed rotor preferably has a diameter greater than or equal to 800 mm. With this regard, it is stipulated that the presence of the linking means holding the blades to one another during their manufacture allows the manufacture of large-diameter DAMs to be envisaged, with blades of great length, since the deformations and vibrations of the latter are reduced, or even eliminated. The blades preferably have a minimal length of 150 mm.

The said integrally bladed rotor preferably has a disk of thickness greater than or equal to 100 mm. However, it may have a thickness of around 160 mm, or even more, due to the high performance specifications likely to be obtained by the abrasive waterjet cutting technique. This thickness also corresponds roughly to the distance along which each blade extends, related to the axis of the DAM, between the leading edge and the trailing edge.

The blades of the integrally bladed rotor are preferably twisted, and the twist angle may be as high as 45°, or even higher.

The said block of material used is preferably made of titanium or one of its alloys.

The said integrally bladed rotor is preferably an integrally bladed rotor for aircraft turbomachine.

Even more preferentially, the said integrally bladed rotor is an integrally bladed rotor of a turbine or compressor rotor of an aircraft turbomachine.

Other advantages and characteristics of the invention will appear in the non-restrictive detailed disclosure below.

BRIEF DESCRIPTION OF THE DRAWINGS

This description will be made with reference to the attached illustrations, among which;

FIG. 1 represents a partial perspective view of an integrally bladed rotor for turbomachine, capable of being obtained through use of the manufacturing method according to the present invention;

DETAILED DESCRIPTION OF PREFERRED EMBODIMENTS

Figure 2A:
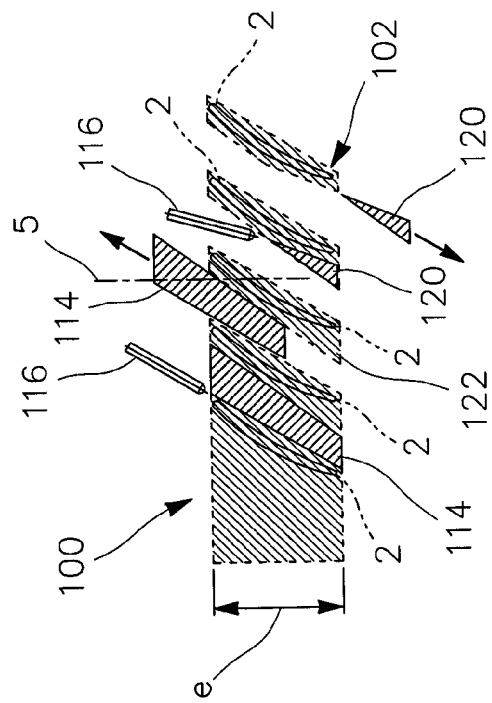
FIGS. 2a to 2e represent views showing diagrammatically the integrally bladed rotor in various steps of its manufacturing method, when the latter takes the form of a first preferred embodiment.

With reference, firstly, to FIG. 1, we see an integrally bladed rotor 1 intended to be obtained through use of a manufacturing method according to the present invention. It is intended preferentially for the constitution of a compressor or turbine rotor of a turbomachine for aircraft.

The integrally bladed rotor, called hereinafter the DAM, which it is sought to obtain through the method forming the subject of the invention, is of large dimensions, i.e. it has a diameter greater than or equal to 800 mm, blades 2 of length at least equal to 150 mm, and a disk 4 of thickness "e" greater than or equal to 130 mm. In addition, the blades held by disk 4 of central axis 5 are twisted substantially, since the twist angle can be as high as 45°, or even higher. For information, this angle corresponds in known manner to the conventional angle between foot 6 and head 8 of a given blade 2.

A first preferred embodiment of the method for manufacturing DAM 1 will now be described with reference to FIGS. 2a to 2e.

First, a block of material made of titanium alloy, also called a "monoblock blank", and preferably pre-machined, is subjected to a first step of turning, the purpose of which is, for example, to machine this block to 1 mm from the final dimensions.

The next step consists of an operation using an abrasive waterjet to cut the solid block, so as to reveal blade preforms.

To accomplish this a very high pressure (for example, pressure of 3000 bar) and very high precision (for example six-axis) waterjet cutting machine (not represented) is used. It is the very high level of water pressure which enables the abrasive to be conveyed, optimising its cutting effect on the material. In a known manner, the waterjet is created using a diamond or sapphire nozzle. In addition, a blending chamber allows abrasive, such as sand, to be added. With this regard, a focusing gun blends the water and sand together, focusing the latter on the area for cutting.

This technique of cutting by means of an abrasive jet allows a substantial material removal rate to be obtained, and also satisfactory repeatability. It thus proves to be very suitable for removing material with the aim of creating inter-blade spaces throughout the full depth "e" of the block of material along its axis 5.

With this regard, FIG. 2a shows in the upper part the block of material 100, when the abrasive waterjet cutting step has been completed. This block therefore has blade preforms 102 extending radially from disk 4, i.e. orthogonally to central axis 5. Generally, the cutting takes place downwards into block 100 so as to reveal inter-blade spaces 110 between circumferentially directly consecutive blade preforms 102.

In addition, it is accomplished so as to reveal linking means between preforms 102, here taking the form of a ring 112 centred on axis 5 and preferably linking all heads 108 of blade preforms 102. Thus, ring 112 constitutes a peripheral annular portion of the cut block 100, and consequently creates an external radial delimitation of inter-blade spaces 110, which is maintained until the cutting step is completed.

This step of cutting by abrasive waterjet may be implemented by accomplishing a first cutting operation the aim of which is to remove a first piece of material extending in a roughly twisted or helical fashion in the radial direction from the disk, followed by a second cutting operation the aim of which is to remove a second less voluminous piece of material, also extending in a roughly twisted or helical fashion in the radial direction.

Figure 2B:
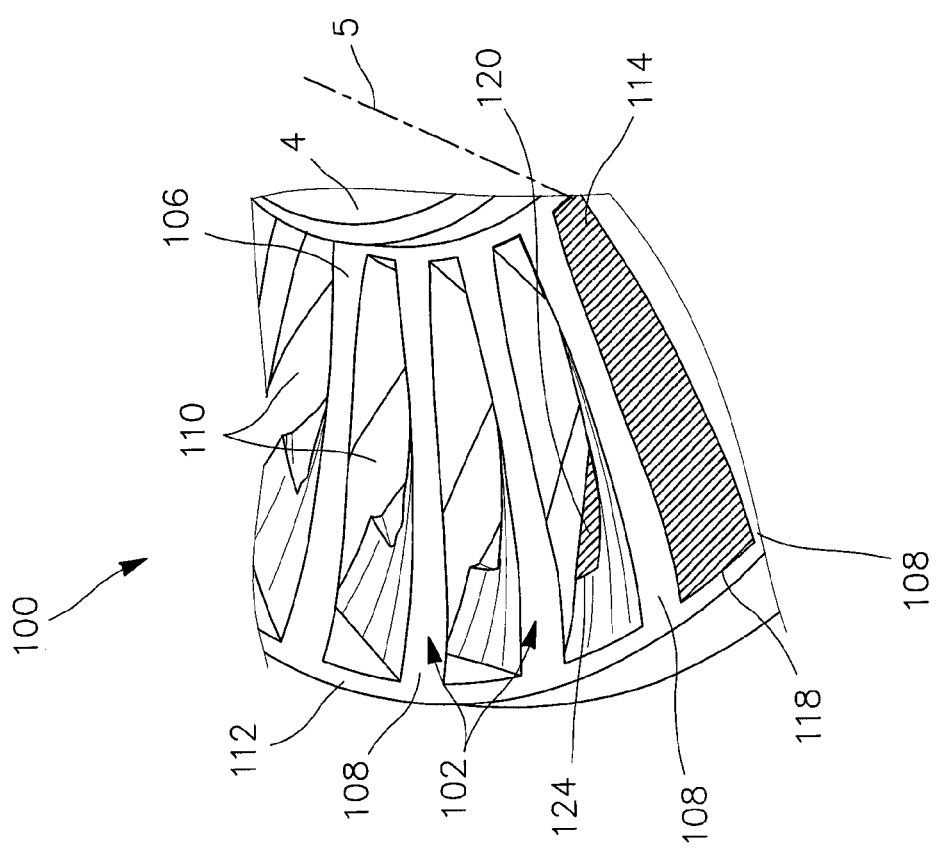

More specifically with reference to the diagrammatic representation of FIG. 2b, it is possible to see on the left-hand part of the latter that the aim of the first cutting operation is to cut a first piece of material 114 extending downwards into the full depth of the block 100 along its axis 5. To accomplish this, the axis of focusing gun 116 is moved along a closed line 118 shown in the lower part of FIG. 2a, initiated from foot 4, extending radially as far as the proximity of the external radial end of the block, without reaching the latter, so as to reveal the ring, where line 118 then follows this ring in the circumferential direction, before extending once again radially towards the interior as far as foot 4, which it then follows until it returns to its initial point.

During its path along the above-mentioned line 118, the axis of gun 116 is subjected to an appropriate additional movement relative to axis 5, which remains preferentially fixed, wherein this additional movement essentially takes the form of a pivoting of the axis of the gun in the radial direction, leading to the formation of a first piece 114, which is roughly twisted in shape in the radial direction. More generally, it is noted that the trajectory followed by gun 116 relative to axis 5 is a trajectory known as a "five-axis" trajectory, obtained using two simultaneous rotations. The first piece 114 is preferentially removed manually by the operator, as is shown diagrammatically by the central part of FIG. 2b. As can be seen in this same figure, in any section orthogonal to the radial direction, piece 114 takes the form of a quadrilateral the two opposing sides of which, extending downwards into the depth of the block, pass respectively as close as possible to the two directly consecutive blades 2 intended to be obtained once the method is completed.

As results from the foregoing, each removal of a first piece 114 reveals the surface of two directly consecutive blade preforms 102. All the first pieces 114, the number of which is dependent on the number of blades desired for the DAM, are preferably cut first, and these pieces 114 are then removed manually, before implementing the second cutting operation.

This second operation is accomplished such that the blade preforms which result from it are as close as possible to the reverse-curve twisted shape of the final blades, which it is difficult to approximate by means of a single, simple cut, given that the abrasive waterjet traverses the block in a roughly rectilinear fashion, in contrast to the curved shape of the blade sections.

With reference to the diagrammatic representation of FIG. 2b, it can be seen in its right-hand part that the purpose of the second cutting operation is, indeed, to cut a second piece of material 120 extending this time only partly downwards into block 100, i.e. only through part of the thickness of radial elements 122 formed by removal of the first pieces 114. In addition, piece 120 also extends only over a radial part of its associated element 122, i.e. it extends from the foot without reaching the ring, as can be seen from FIG. 2a.

To accomplish this the axis of focusing gun 116 is moved along a radial line 124, a part of which is shown in FIG. 2a. It is initiated from foot 4, and thus extends roughly radially without reaching ring 112 which appeared when the first pieces 114 were removed. For example, line 124 traversed by the abrasive waterjet is located approximately in the mid-depth of radial elements 122, and is stopped beyond radial mid-height of these latter.

During its path along the above-mentioned line 124, the axis of gun 116 is subjected to an appropriate additional movement relative to axis 5, which remains preferentially fixed, wherein this additional movement essentially takes the form of a pivoting of the axis of the gun in the radial direction, leading to the formation of a second piece 120, which is roughly twisted in shape in the radial direction. More generally, it is noted that the trajectory followed by gun 116 relative to axis 5 is a trajectory known as a "five-axis" trajectory, obtained using two simultaneous rotations. This second piece 120, when removed in its entirety from foot 5, again using an abrasive waterjet, preferentially separates under its own weight, without any action by the operator, as is shown diagrammatically by the right-hand part of FIG. 2b.

In relation thereto, it is noted that gun 116 is moved not only along the roughly radial line 124, but also along a line (not represented) taking the shape of a circular part extending from the inner radial end of line 124, along foot 4, for the total separation of piece 120 from the latter.

As can be seen in FIG. 2b, in any section orthogonal to the radial direction, piece 120 has the shape of a triangle, one of the sides of which comes as close as possible to blade 2 intended to be obtained from radial element 122 concerned, once the method is completed.

When all the second pieces 120 have been removed the block now shows only the blade preforms 102 attached to one another in the area of their heads 108, by ring 112. The abrasive waterjet cutting step is then complete.

In this first preferred embodiment the method is continued by a step of removing ring 112 linking preforms 112. This step is accomplished in any manner deemed appropriate by the skilled man in the art, such as wire cutting or milling. With this regard, FIG. 2c shows diagrammatically the separation of ring 112 from the remainder of block 100, through a breakage of the link between this ring 112 and the heads 108 of the preforms. When all these roughly circumferential breakages 128 have occurred the ring can indeed be extracted from the block through relative movement along axis 5 with regard to the latter. Ring 112 is then considered to be eliminated. Alternatively, ring 112 may be removed only through the elimination of the parts of the latter located between preforms 102, with the other parts located at the radial end of these preforms being then kept, for example with a view to subsequently constituting a part of the blade heads. The sought breakages are then no longer roughly circumferential like the breakages 128 of FIG. 2c, but roughly radial, and always in the depth of the thickness of the block.

A step of milling of blade preforms 102 is then implemented, accomplished so as to obtain profiled blade blanks 202. In other words, the goal of this step, implemented for example using a five-axis milling machine, is to remove the remaining material on blade preforms 102, in order to approximate as closely as possible to the final dimensions, for example to 0.6 mm.

Figure 2D:
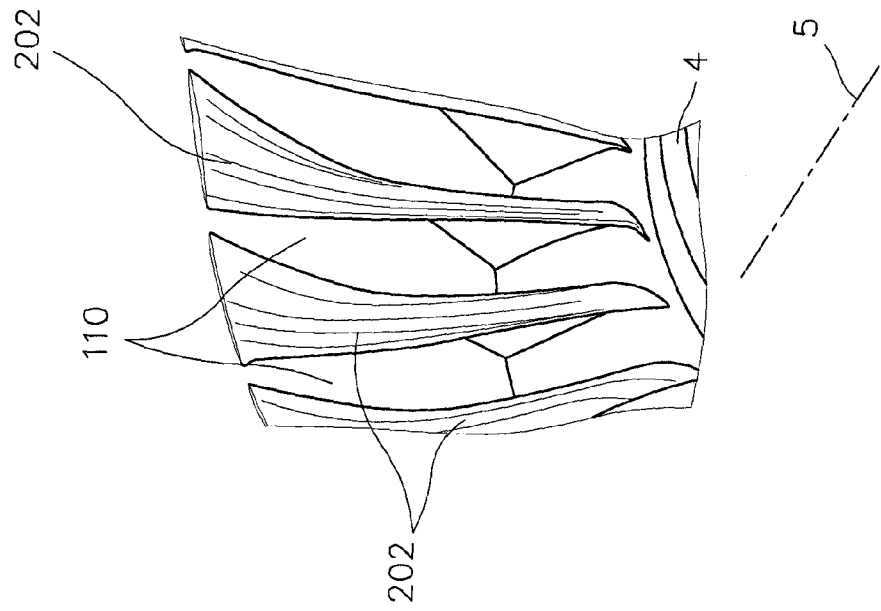
Figure 2C:
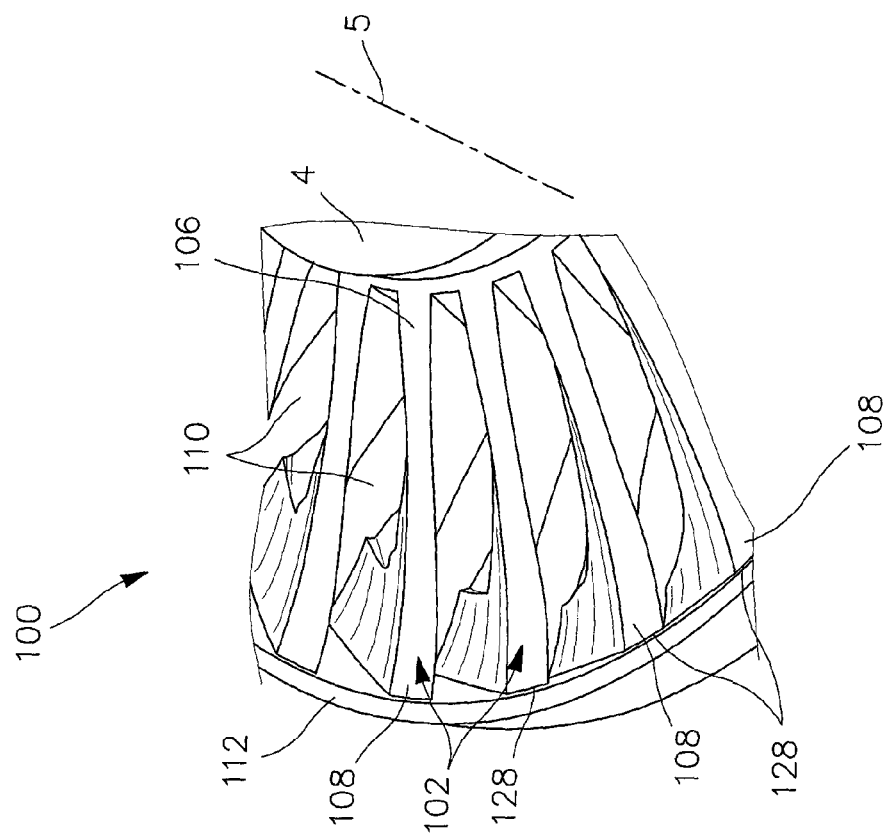

Here, preforms 102 are preferentially machined one after the other, in order that each of them forms a profiled blade blank 202, as represented in FIG. 2d.

After this, another milling step is accomplished; the aim of this step, called the finishing step, is to obtain, by milling, blades 2 with the final profile, from blanks 202. The tooling used enables more precise machining, allowing the final dimensions to be obtained, and thus blades 2, as is shown on the right-hand part of FIG. 2e.

At this stage of the process the remaining block of material has a volume less than 25% of the volume of the same block, as it was just before the initiation of the abrasive waterjet cutting step, i.e. just after the abovementioned turning step.

Moreover, the process may be continued by one or more traditional steps, among which are a polishing step, for example by manual adjustment or tribofinishing, a shot-blasting step, a step of cutting to length of the blades, and/or a step of balancing of the DAM.

A second embodiment of the method according to the invention will now be described.

Firstly, in this case also, a block of material made of titanium alloy, preferably pre-machined, is subjected to a first step of turning, the purpose of which is, for example, to machine this block to 1 mm from the final dimensions.

The next step consists in cutting by an abrasive waterjet of the solid block, in order to reveal the blade preforms, held together by the holding ring at the preform heads. This step is identical or similar to that described above, with reference to FIGS. 2a and 2b.

A step of milling of blade preforms 102 is then implemented, accomplished so as to obtain profiled blade blanks 202. In other words, the goal of this step, implemented for example using a five-axis milling machine, is to remove the remaining material on blade preforms 102, in order to approximate as closely as possible to the final dimensions, for example to 0.6 mm.

Figure 3A:
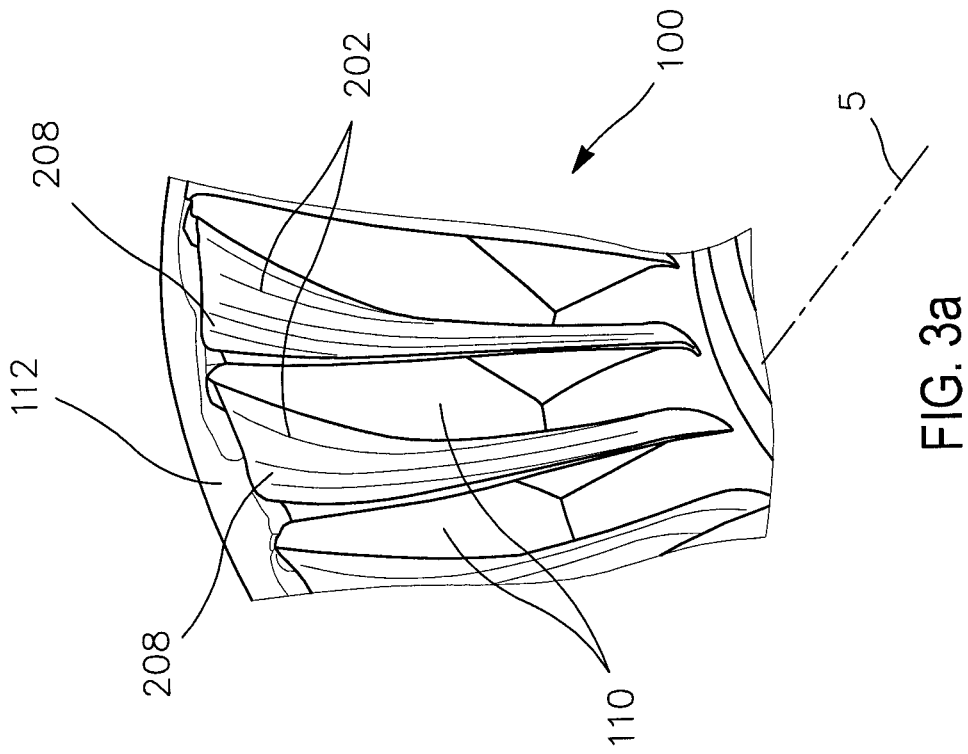
FIGS. 3a to 3c represent views showing diagrammatically the integrally bladed rotor in various steps of its manufacturing method, when the latter takes the form of a second preferred embodiment.

In this case, the preforms 102 are preferentially machined one after the other, in order that each forms a profiled blade blank 202, as represented in FIG. 3a, also showing heads 208 of blanks 202 linked to one another by ring 112, still forming a peripheral annular part of block 100.

Figure 3C:
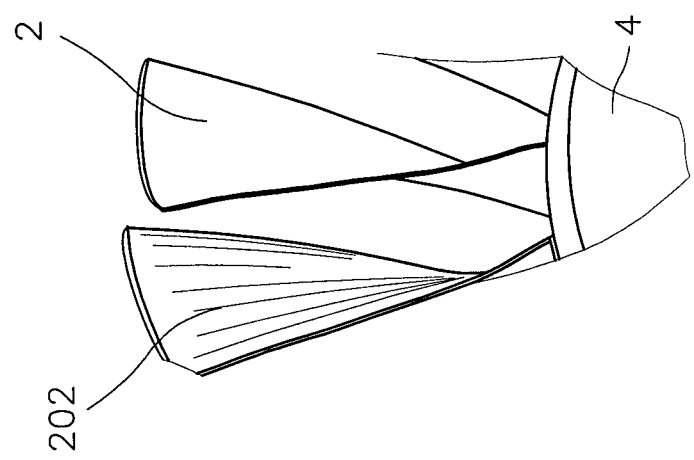
Figure 3B:
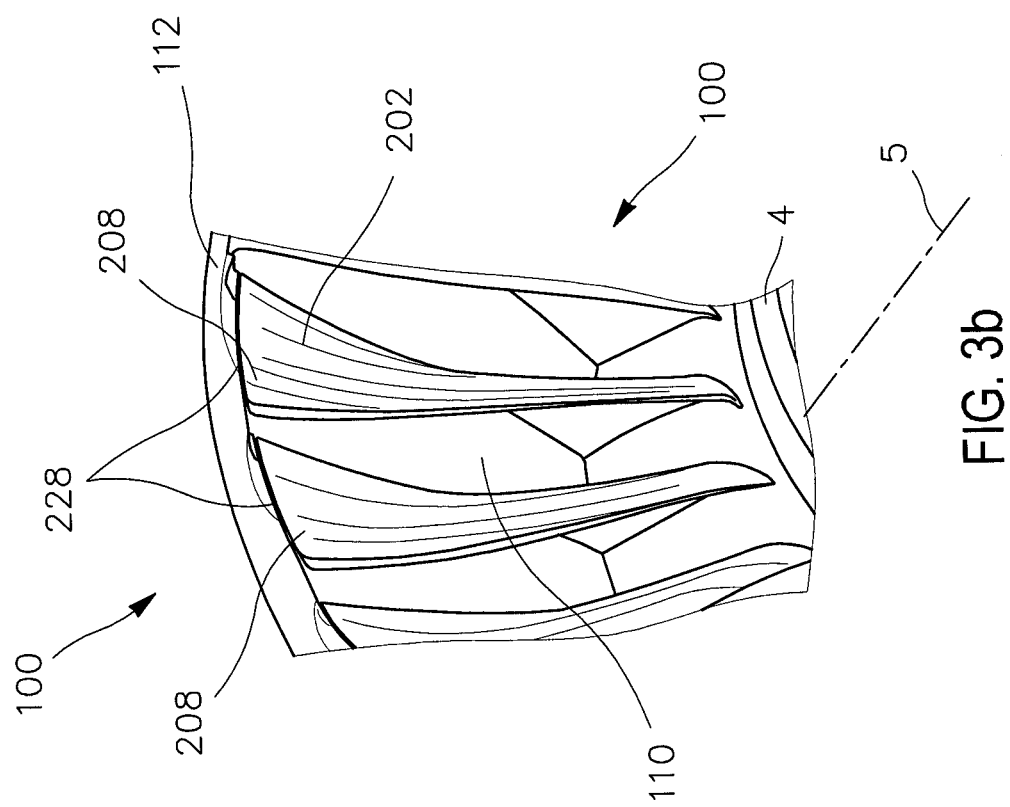

In this second preferred embodiment the method is continued by a step of removing ring 112 linking preforms 112. This step is accomplished in any manner deemed appropriate by the skilled man in the art, such as wire cutting or milling. With this regard, FIG. 3b shows diagrammatically the separation of ring 112 from the remainder of block 100, through a breakage of the link between this ring 112 and heads 208 of the blanks. When all these roughly circumferential breakages 228 have occurred the ring can indeed be extracted from the block through relative movement along axis 5 with regard to the latter. Ring 112 is then considered to be eliminated. Here again, alternatively, ring 112 may be removed only through the elimination of the parts of the latter located between blanks 202, with the other parts located at the radial end of these blanks being then kept, for example with a view to subsequently constituting a part of the blade heads. The sought breakages are then no longer roughly circumferential like the breakages 228 of FIG. 3b, but roughly radial, and always in the depth of the thickness of the block.

After this, a new milling step is implemented; the aim of this step, called the finishing step, is to obtain, by milling, blades 2 with the final profile, from blanks 202. The tooling used enables more precise machining, allowing the final dimensions to be obtained, and thus blades 2 as is shown on the right-hand part of FIG. 3c.

At this stage of the process the remaining block of material has a volume less than 25% of the volume of the same block, as it was just before the initiation of the abrasive waterjet cutting step, i.e. just after the abovementioned turning step.

Moreover, the process may be continued by one or more traditional steps, among which, as indicated above, are a polishing step, a shot-blasting step, a step of cutting to length of the blades, and/or a step of balancing of the DAM.

A third embodiment of the method according to the invention will now be described.

Firstly, in this case also, a block of material made of titanium alloy, preferably pre-machined, is subjected to a first step of turning, the purpose of which is, for example, to machine this block to 1 mm from the final dimensions.

The next step consists in cutting by an abrasive waterjet of the solid block, in order to reveal the blade preforms, held together by the holding ring at the preform heads. This step is identical or similar to that described above, with reference to FIGS. 2a and 2b. A step of milling of the blade preforms is then implemented, accomplished so as to obtain profiled blade blanks. This step is identical or similar to that described above with reference to FIG. 3a, such that it aim is to approximate as closely as possible to the final dimensions, for example to 0.6 mm.

In this third preferred embodiment, the method is continued by a new milling step; the aim of this step, called the finishing step, is to obtain, by milling, blades 2 with the final profile, from blanks 202. The tooling used enables more precise machining, allowing the final dimensions to be obtained, and thus blades 2 as is shown on the right-hand part of FIG. 4a. This same figure also shows heads 8 of blades 2 linked to one another through ring 112, still forming a peripheral annular part of block 100.

Figure 4B:
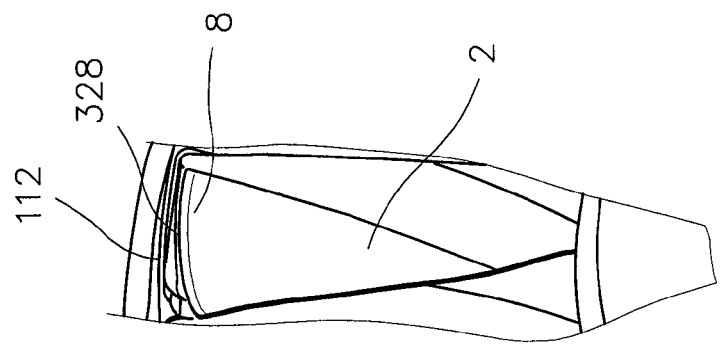
FIGS. 4a and 4b represent views showing diagrammatically the integrally bladed rotor in various steps of its manufacturing method, when the latter takes the form of a third preferred embodiment.
Figure 4A:
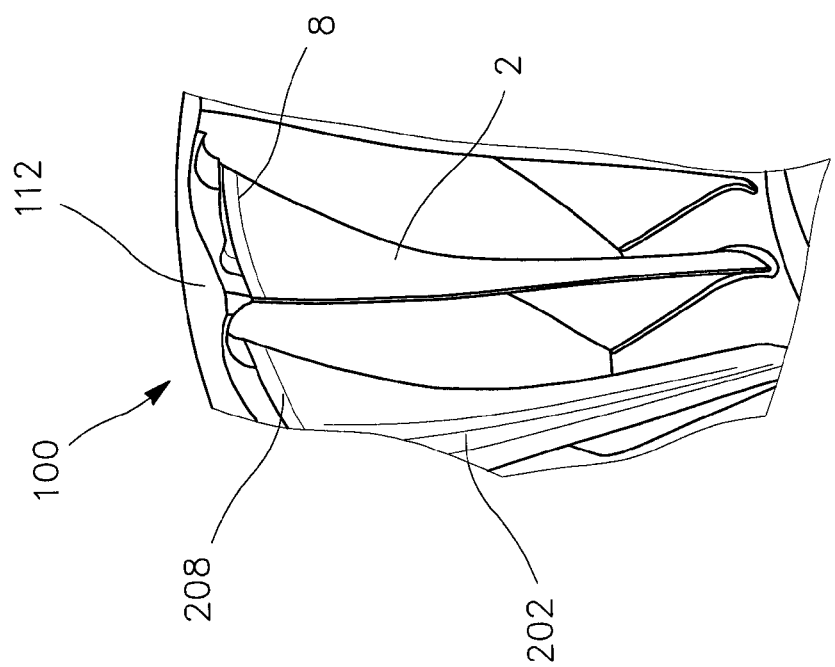

The method is continued by a step of removal of ring 112 linking blade preforms 2. This step is accomplished in any manner deemed appropriate by the skilled man in the art, such as wire cutting or milling. With this regard, FIG. 4b shows diagrammatically the separation of ring 112 from the remainder of block 100, through a breakage of the link between this ring 112 and heads 8 of the blades. When all these roughly circumferential breakages 328 have occurred, the ring can indeed be extracted from the block through relative movement along axis 5 with regard to the latter. Ring 112 is then considered to be eliminated. Here again, alternatively, ring 112 may be removed only through the elimination of the parts of the latter located between blades 2, with the other parts located at the radial end of these blades being then kept, for example with a view to subsequently constituting a part of heads of the blades. The sought breakages are then no longer roughly circumferential like the breakages 328 of FIG. 4b, but roughly radial, and always in the depth of the thickness of the block.

At this stage of the process the remaining block of material has a volume less than 25% of the volume of the same block, as it was just before the initiation of the abrasive waterjet cutting step, i.e. just after the abovementioned turning step.

The process may then be continued by one or more traditional steps, among which, as indicated above, are a polishing step, a shot-blasting step, a step of cutting to length of the blades, and/or a step of balancing of the DAM.

A fourth preferred embodiment of the method for manufacturing DAM 1 will now be described with reference to FIGS. 5a to 5c. It differs from the first embodiment essentially in that the holding ring is no longer level with the heads of the blade preforms, but level with a more central part of the head, at some distance radially towards the interior of these heads.

Firstly, a block of material made of titanium alloy, preferably pre-machined, is subjected to a first step of turning, the purpose of which is, for example, to machine this block to 1 mm from the final dimensions.

The next step consists of an operation using an abrasive waterjet to cut the solid block, so as to reveal blade preforms.

To accomplish this, once again, a waterjet cutting machine (not represented) of the type described above is used.

Figures 5A, 5B:
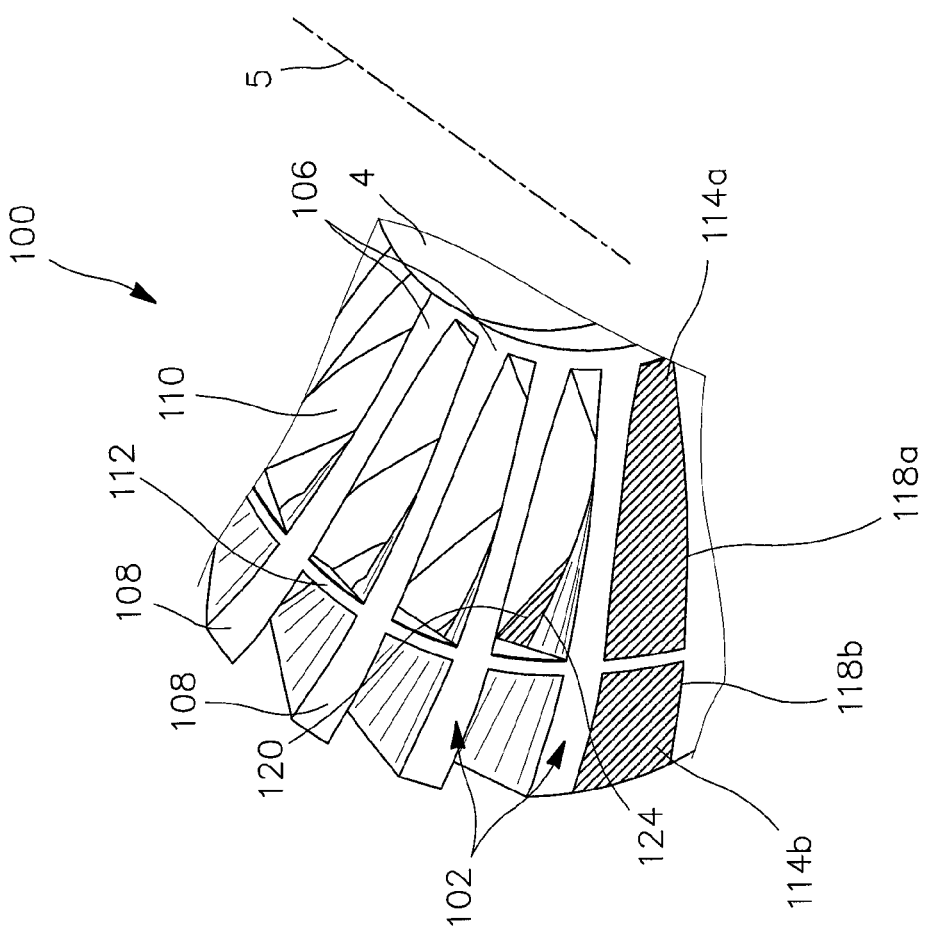
FIGS. 5a to 5c represent views showing diagrammatically the integrally bladed rotor in various steps of its manufacturing method, when the latter takes the form of a fourth preferred embodiment.
Figure 5C:
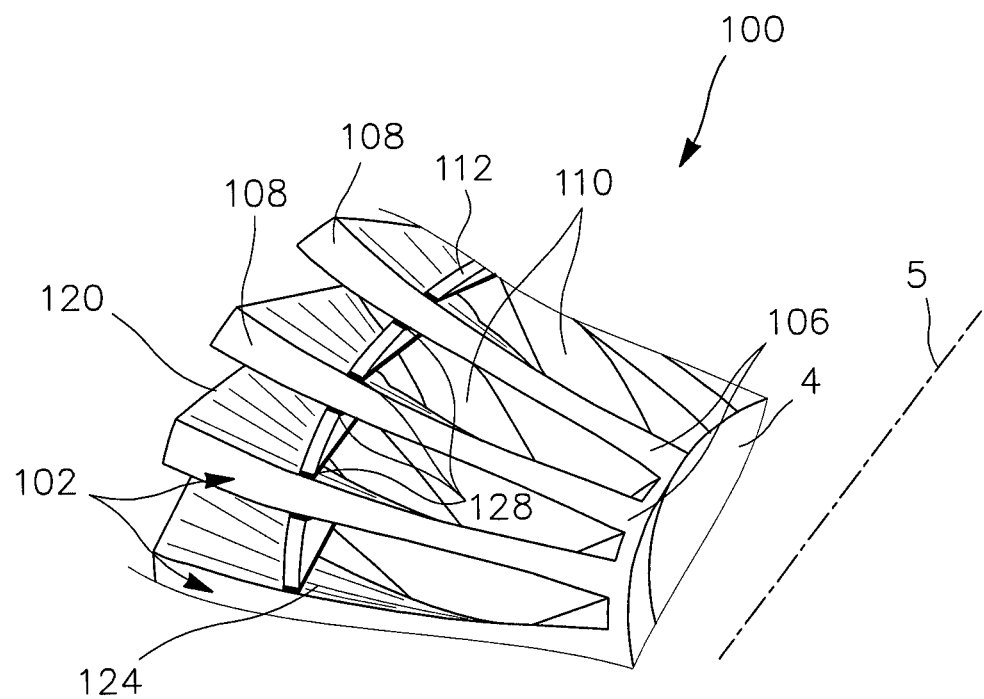

With this regard, FIG. 5a shows in the upper part the block of material 100, when the abrasive waterjet cutting step has been completed. This block therefore has blade preforms 102 extending radially from disk 4, i.e. orthogonally to central axis 5. Generally, the cutting takes place downwards into block 100 so as to reveal inter-blade spaces 110 between circumferentially directly consecutive blade preforms 102.

In addition, it is undertaken so as to reveal linking means between preforms 102, here taking the form of a ring 112 centred on axis 5. The latter preferably links all blade preforms 102 to one another, at some distance, from foot 4, between approximately half and five sixths of the total length of the preform. Thus, ring 112 is located radially towards the interior relative to heads 108 of the blade preforms, and consequently creates a residue of material within inter-blade spaces 110, before being eliminated in a subsequent step of the method.

This step of cutting by abrasive waterjet may be implemented by accomplishing a first cutting operation the aim of which is to remove two first pieces of material each extending in a roughly twisted or helical fashion in the radial direction from the disk, where these first two pieces are radially separated from one another by the ring, the first operation then being followed by a second operation the aim of which is to remove a second piece, also extending roughly in a twisted or helical fashion in the radial direction.

More specifically with reference to the diagrammatic representation of FIG. 5b, it is possible to see on the left-hand part of the latter that the aim of the first cutting operation is indeed to cut a first piece of material 114a extending downwards into the full depth of block 100 along its axis 5. To accomplish this, the axis of focusing gun 116 is moved along a closed line 118a shown in the lower part of FIG. 5a, initiated from foot 4, extending radially as far as the theoretical position of ring 112, where line 118a then follows this ring in the circumferential direction, before extending once again radially towards the interior as far as foot 4, which it then follows until it returns to its initial point.

During its path along abovementioned line 118a, the axis of gun 116 is subjected to an appropriate additional movement relative to axis 5, which remains preferentially fixed, wherein this additional movement essentially takes the form of a pivoting of the axis of the gun in the radial direction, leading to the formation of a first piece 114a, which is roughly twisted in shape in the radial direction. More generally, it is noted that the trajectory followed by gun 116 relative to axis 5 is a trajectory known as a "five-axis" trajectory, obtained using two simultaneous rotations. The first piece 114a is preferentially removed manually by the operator, as is shown diagrammatically by the central part of FIG. 5b.

As can be seen in this same figure, in any section orthogonal to the radial direction, the piece 114a takes the form of a quadrilateral the two opposing sides of which, extending downwards into the depth of the block, pass respectively as close as possible to the two directly consecutive blades 2 intended to be obtained once the method is completed.

After this, still with reference to the left-hand part of FIG. 5b and the lower part of FIG. 5a, the first cutting operation is carried out so as to cut out another first piece of material 114b extending into the full depth of block 100 along its axis 5, and globally located within the external radial extension of piece 114a, from which it is separated by the part of ring 112 located facing these two pieces. To accomplish this, the axis of focusing gun 116 is moved along line 118b, which has an overall "U" shape, shown in the lower part of FIG. 5a, initiated from a radial end of block 100, and extending radially towards the interior as far as the theoretical position of ring 112; and line 118b then follows this ring in the circumferential direction, before once again extending radially towards the exterior as far as another radial end of block 100.

During its path along abovementioned line 118b, the axis of gun 116 is subjected to an appropriate additional movement relative to axis 5, which remains preferentially fixed, wherein this additional movement essentially takes the form of a pivoting of the axis of the gun in the radial direction, leading to the formation of another first piece 114b, which is roughly twisted in shape in the radial direction. This first piece 114b is also preferentially removed manually by the operator, as is shown diagrammatically by the central part of FIG. 5b. As can be seen in this same figure, in any section orthogonal to the radial direction, the piece 114b also takes the form of a quadrilateral the two opposing sides of which, extending downwards into the depth of the block, pass respectively as close as possible to the two directly consecutive blades 2 intended to be obtained once the method is completed.

As results from the foregoing, each removal of a first piece 114a, 114b reveals the surface of two directly consecutive blade preforms 102. All the first pieces 114a, 114b, the number of which is dependent on the number of blades desired for the DAM, are preferably cut first, and these pieces are then removed manually, before implementing the second cutting operation.

This second operation is accomplished such that the blade preforms which result from it are as close as possible to the reverse-curve twisted shape of the final blades, which it is difficult to approximate by means of a single, simple cut, given that the abrasive waterjet traverses the block in a roughly rectilinear fashion, in contrast to the curved shape of the blade sections.

With reference to the diagrammatic representation of FIG. 5b, it can be seen in its right-hand part that the purpose of the second cutting operation is, indeed, to cut a second piece of material 120 extending this time only partly downwards into block 100, i.e. only through part of the thickness of the radial elements 122 formed by the removal of first pieces 114a, 114b. In addition, piece 120 also extends only over a radial part of its associated element 122, i.e. it extends from the foot without reaching preform head 108, i.e., for example, only as far as ring 112, as can be seen from FIG. 5a.

To accomplish this the axis of focusing gun 116 is moved along a radial line 124, a part of which is shown in FIG. 5a. It is initiated from foot 4, and thus extends roughly radially until it reaches ring 112 which appeared when first pieces 114a, 114b were removed. For example, line 124, traversed by the abrasive waterjet, is located approximately at mid-depth of radial elements 122.

During its path along abovementioned line 124, the axis of gun 116 is subjected to an appropriate additional movement relative to axis 5, which remains preferentially fixed, wherein this additional movement essentially takes the form of a pivoting of the axis of the gun in the radial direction, leading to the formation of a second piece 120, which is roughly twisted in shape in the radial direction. Here too, more generally, it is noted that the trajectory followed by gun 116 relative to axis 5 is a trajectory known as a "five-axis" trajectory, obtained using two simultaneous rotations. This second piece 120, when removed in its entirety from foot 5, again using an abrasive waterjet, preferentially separates under its own weight, without any action by the operator, as is shown diagrammatically by the right-hand part of FIG. 5b.

In relation thereto, it is noted that gun 116 is moved not only along the roughly radial line 124, but also along a line (not represented) taking the shape of a circular part extending from the inner radial end of line 124, along foot 4, for the total separation of piece 120 from the latter.

As can be seen in FIG. 5b, in any section orthogonal to the radial direction, piece 120 has the shape of a triangle, one of the sides of which comes as close as possible to blade 2 intended to be obtained from radial element 122 concerned, once the method is completed.

Once all the second parts 120 have been removed the block now has only blade preforms 102 attached to one another by ring 112, which then takes the shape of an annular ring interrupted by each preform 102. The abrasive waterjet cutting step is then complete.

In this fourth preferred embodiment the method is continued by a step of removing ring 112 linking preforms 112. This step is accomplished in any manner deemed appropriate by the skilled man in the art, such as wire cutting or milling. With this regard, FIG. 5c shows diagrammatically the separation of ring 112 from the remainder of block 100, through a breakage of the links between this ring 112 and each of the preforms. Once all these roughly radial breakages 128 have occurred, the ring can then indeed be extracted easily from block 100, section by section.

A step of milling of blade preforms 102 is then implemented, accomplished so as to obtain profiled blade blanks 202. This step is identical or similar to that described above, with reference to FIG. 2d.

After this, another milling step is accomplished; the aim of this step, called the finishing step, is to obtain, by milling, blades 2 with the final profile, from blanks 202. This step is identical or similar to that described above, with reference to FIG. 2e.

Figure 2E:
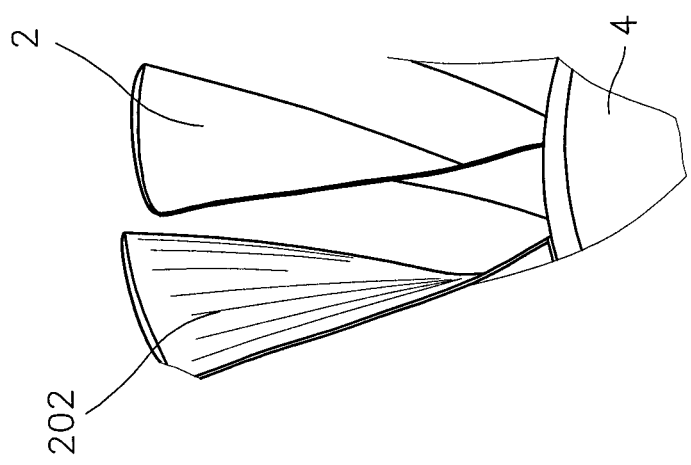

The tooling used enables more precise machining, allowing the final dimensions to be obtained, and thus blades 2, as is shown on the right-hand part of FIG. 2e.

At this stage of the process the remaining block of material has a volume less than 25% of the volume of the same block, as it was just before the initiation of the abrasive waterjet cutting step, i.e. just after the abovementioned turning step.

Moreover, the process may be continued by one or more traditional steps, among which are a polishing step, for example by manual adjustment or tribofinishing, a shot-blasting step, a step of cutting to length of the blades, and/or a step of balancing of the DAM.

It should be noted that this fourth embodiment could be combined with either of the second or third preferred embodiments described above, i.e. the ring could alternatively be removed after the step of milling of the blade preforms, or indeed after the step of finishing by milling.

Naturally, various modifications can be made by the skilled man in the art to the invention which has just been described, solely as non-restrictive examples.

The invention claimed is:

1. A method of manufacture of an integrally bladed rotor, comprising:
   cutting a block of material by an abrasive waterjet, undertaken so as to reveal blade preforms extending radially from a disk, whilst retaining the material forming a linking mechanism between at least two preforms of directly consecutive blades, wherein the linking mechanism is spaced radially from the disk; and
   removal of the linking mechanism.

2. A method according to claim 1, in which the cutting by abrasive waterjet is accomplished such that the linking mechanism links a number of blade preforms strictly higher than three, and which are directly consecutive.

3. A method according to claim 2, in which the cutting by abrasive waterjet is accomplished such that the linking mechanism roughly forms a ring.

4. A method according to claim 3, in which the cutting by abrasive waterjet is accomplished such that the ring links all the blade preforms to one another.

5. A method according to claim 3, wherein said cutting reveals a plurality of heads, each of said blade preforms having one of said heads, and wherein the cutting by abrasive waterjet is accomplished such that the ring links said heads to one another.

6. A method according to claim 4, in which the cutting by abrasive waterjet is accomplished such that the ring links all heads of the blade preforms to one another.

7. A method according to claim 1, in which the integrally bladed rotor has a diameter greater than or equal to 800 mm.

8. A method according to claim 1, in which the integrally bladed rotor has a disk of thickness greater than or equal to 100 mm.

9. A method according to claim 1, in which the blades of the integrally bladed rotor are twisted.

10. A method according to claim 1, in which the used block of material is made of titanium or one of its alloys.

11. A method according to claim 1, in which the integrally bladed rotor is an integrally bladed rotor for aircraft turbomachine.

12. A method according to claim 1, in which the integrally bladed rotor is an integrally bladed rotor of an aircraft turbomachine turbine or compressor rotor.

* * * * *